Patented Jan. 19, 1954

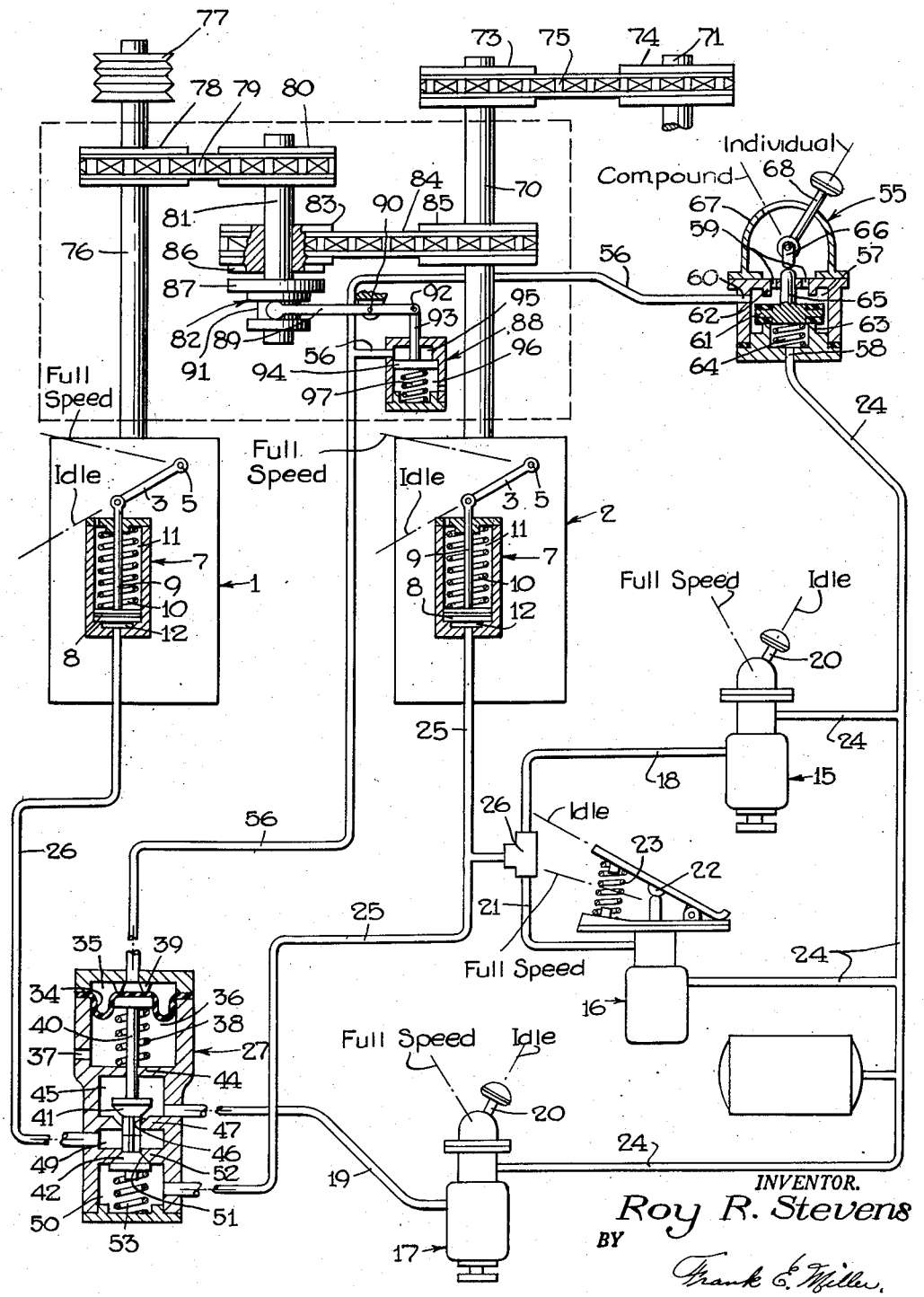

2,666,295

UNITED STATES PATENT OFFICE 2,666,295

FLUID PRESSURE ENGINE COMPOUNDING AND SPEED CONTROL APPARATUS

Roy R. Stevens, Forest Hills, Pa., assignor to Westinghouse Air Brake Company, a corporation of Pennsylvania Original application September 22, 1948, Serial No. 50,596, now Patent No. 2,642,969, dated June 23, 1953. Divided and this application December 20, 1949, Serial No. 133,969

1 Claim. (Cl. 60—97)

This invention relates to fluid pressure control apparatus and more particularly to fluid pressure apparatus for controlling operation of a multiple engine power package, such as may be employed in rotary well drilling rig equipment, for example, the present application being a division of my copending patent application, Serial No. 50,596, filed September 22, 1948, now Patent No. 2,642,969, and assigned to the assignee of this application.

It is a principal object of the invention to provide fluid pressure control apparatus for selectively effecting driving connection between one or all of said engines while automatically assuring synchronism of operation of the engines when all are compounded.

Other objects and advantages will be apparent from the following more detailed description of the invention.

In the accompanying drawing, the single figure is a diagrammatic view, partly in outline and partly in section, of a power package or unit embodying the invention.

Description

Referring to the drawing, the reference numerals 1 and 2 designate two alike internal combustion engines (two engines being employed merely to illustrate the invention) each comprising speed control means (not shown) adjustable in accord with position of a respective governor control lever 3. Lever 3 is operatively connected to a governor shaft 5 and is adapted for pivotal movement thereabout to and between opposite extreme limit positions, "Idle" and "Full speed," indicated by dot and dash lines so titled in the drawing, for adjusting the governor device through turning movement of shaft 5 to effect adjustment of the speed of the respective engine accordingly.

For adjusting position of lever 3, a fluid pressure cylinder device 7 is provided which comprises a piston 8 which is operatively connected by means of a piston rod 9 to said lever. A control spring 10 is disposed in a spring chamber 11 at one side of piston 8, arranged to urge said piston in the direction of a pressure chamber 12 at its opposite side toward a rest position in which it is shown in the drawing with lever 3 in "Idle" position. Piston 8 will effect positioning of lever 3 in accord with the degree of pressure of fluid supplied to the chamber 12 acting thereon to oppose action of spring 10. "Full speed" position of lever 3 will correspond to a certain maximum pressure of fluid in chamber 12 and "Idle" position to a certain minimum pressure in said chamber.

For effecting variation in pressure of fluid in the respective pressure chambers 12 in the cylinder devices 7, and thereby effecting adjustment of the speed of engines 1, 2, self-lapping control valve devices 15, 16, 17 are provided.

The self-lapping control valve devices 15, 16, 17 may be substantially similar to a control valve device disclosed and described in detail in Patent No. 2,398,877, issued to A. J. Bent, April 23, 1948, and assigned to the assignee of the present application. Self-lapping control valve devices 15, 17 are operable to effect variations in pressure of fluid in respective pipes 18, 19 in accord with position of an operator's handle 20, while self-lapping control valve device 16 is operable to effect variation in pressure of fluid in a pipe 21 in accord with position of a foot pedal 22. The handles 20 are movable to and between opposite limit positions corresponding to "Idle" and "Full speed" positions of the governor levers 3 in the engines 1, 2. Likewise, foot pedal 22 may be so positioned also to and between such limit positions, indicated by dot and dash lines so titled. "Idle" position of handles 20 and of foot pedal 22 corresponds to a certain minimum pressure of fluid in respective pipes 18, 19, 21, while "Full speed" position of said handles and foot pedal correspond to a certain maximum pressure of fluid in these pipes. Handles 20 will remain in any position to which they are moved, while foot pedal 22 is constantly urged toward its "Idle" position by action of a spring 23. A fluid pressure supply pipe 24, adapted to be connected to a source of fluid under pressure, such as a compressor (not shown), is connected to each of the self-lapping control valve devices 15, 16, 17 for conveying fluid under pressure thereto.

Pipes 18, 21 are connected in common to a pipe 25 by way of a double check valve 26 in such a manner that pressure of fluid in said pipe 25 may be varied either by operation of valve devices 15 or 16 independently, or a pressure at some value may be established and held therein by fixing a position of handle 20 in device 15 and effecting variation in pressure above that value by adjusting position of foot pedal 22 in device 16, thus affording flexibility of operation.

Pipe 25 is constantly connected to the pressure chamber 12 in the cylinder device 7 on the engine 2, and according to a feature of the invention, is adapted to be connected to the corresponding chamber in cylinder device 7 on engine 1, by way of a pipe 26 and a relay valve device 27, so that variation in pressure of fluid in pipe 25 will effect simultaneous synchronous adjustment of speed on both engines 1, 2 through operation of either of the valve devices 15, 16. Relay valve device 27 is also operable to disconnect pipe 25 from pipe 26 and to connect the latter pipe to the pipe 19 so that the speed of engine 1 will then be under the control of valve device 17, with the speed of engine 2 under control of either or both of valve devices 15, 16.

The relay valve device 27 may be of usual construction comprising a casing in which is clamped a diaphragm 34. At one side of diaphragm 34 there is a control pressure chamber 35 adapted to be supplied with fluid under pressure for urging said diaphragm to deflect in the direction of a chamber 36 at its opposite side. Chamber 36 is connected to a port 37 opening outwardly through the casing. A control spring 38 is disposed in chamber 36 adapted and arranged to urge diaphragm 34 in the direction of control chamber 35 toward its rest position in contact with a shoulder 39 formed in the casing, in which position it is shown in the drawing. A stem 40 is secured for reciprocable movement with deflection of diaphragm 34 for actuating two valves 41, 42. Stem 40 projects through chamber 36 and is slidably guided in a bore which opens through a partition 44 dividing chamber 36 from a chamber 45. The projecting end of stem 40 has an operating connection with valve 41 which is disposed in the chamber 45. By reciprocable movement of stem 40, valve 41 is brought into and out of seating engagement with a valve seat 46 formed at one end of a bore extending through a partition 47 which separates the chamber 45 from a chamber 49. The valve 42 is disposed in a chamber 50 and arranged to cooperate with a seat 51 formed at one end of a bore extending through a partition 52 which separates chamber 49 from the chamber 50. Valves 41, 42 are secured to respective fluted stems slidably mounted in the bores extending through partitions 47, 52. A bias spring 53 is arranged to urge valve 42 to a seated position closing chamber 50 from chamber 49, while, through contact with the fluted stems, valve 41 is at the same time urged away from seat 46, opening chamber 45 to the chamber 49.

When fluid under pressure is supplied to the control chamber 35 in relay valve device 27, through consequent deflection of diaphragm 34 and thereby movement of stem 40, the valve 41 is seated and the valve 42 is unseated. Chamber 49 is thus closed off from chamber 45 and open to chamber 50.

When fluid under pressure is released from control chamber 35, the relay valve device will assume the position in which it is shown in the drawing with valve 42 seated and valve 41 unseated. At this time, chamber 49 is open to chamber 45 and closed to chamber 50.

Pipe 19 is connected to chamber 45 in relay valve device 27, pipe 25 is connected to chamber 50 in said device and pipe 26 is connected to the chamber 49 in said device. A control valve device 55 is arranged to control supply and release of fluid under pressure to and from the control chamber 35 in relay valve device 27 by way of a pipe 56 connected to said chamber.

Valve device 55 may comprise a casing having a chamber 57, a supply opening 58 at one end connected to the supply pipe 24, an exhaust opening or openings 59 open to atmosphere, and a delivery opening 60 intermediate openings 58, 59 and connected to the pipe 56. A double faced valve 61 is disposed in chamber 57 arranged to cooperate with oppositely disposed seats 62, 63 encircling openings 59, 58, respectively, to control communication between chamber 57 and said openings. Valve 61 is urged toward a position seated on seat 62 by action of a compression spring 64. A stem 65 is attached to valve 61 through which said valve may be actuated. A cam 66, disposed within a cap 67 secured to the casing, is arranged to be turned about a pivotal connection for actuating stem 65. An operator's handle 68 is attached to cam 66 for effecting turning movement of same. Handle 68 extends outwardly through a slot formed in the cap 67, the opposite ends of which slot may serve to define two positions of the handle, "Compound" and "Individual," indicated in the drawing by dot and dash lines so titled.

In "Individual" position of handle 68, in which it is shown in the drawing, valve 61 is seated by cam 66 on seat 63 with pipe 24 closed from chamber 57 and pipe 56 open to atmosphere via said chamber and the ports 59. Relay valve device 27 is therefore positioned as shown in the drawing with the pipe 26 consequently connected to pipe 19 so that the speed of engines 1, 2 may be controlled individually, as will be appreciated from previous description.

When handle 68 in device 55 is moved from "Individual" to "Compound" position, valve 61 is caused by spring 64 to seat on seat 62, closing ports 59 and opening port 58. Fluid under pressure from pipe 24 will then flow into pipe 56 to control chamber 35 in relay valve device 27 which will respond to disconnect pipe 19 from pipe 26 and connect the latter pipe to pipe 25 so that the speed of both engines 1, 2 may be controlled simultaneously by operation of either or both valve devices 15, 16, as previously described.

Engine 2 is adapted and arranged to drive a shaft 70, and thereby to drive an input shaft 71 of such as a variable speed transmission (not shown) through the medium of sprocket wheels 73, 74, secured for rotation with shafts 70, 71, respectively, and a chain 75.

Engine 1 is adapted and arranged to drive a shaft 76 which may be provided with a pulley 77 or the like to allow for operative connection to a mud pump (not shown), for example, such as is employed in rotary drilling rig equipment. Shaft 76 is arranged to be connected to the shaft 70 of engine 2 through a sprocket wheel 78 secured to shaft 76, a chain 79, a sprocket wheel 80 secured to a shaft 81, a friction clutch 82, a sprocket wheel 83, a chain 84, and a sprocket wheel 85 secured for rotation with the shaft 70.

One friction element 86 of the friction clutch 82 is secured to the sprocket wheel 83. Sprocket wheel 83 and friction element 86 are free to rotate on shaft 81 which extends therethrough. A second friction element 87 of clutch 82, disposed opposite and parallel to element 86 in its disengaged position in which it is shown in the drawing, is secured for rotation with shaft 81 and is slidable axially thereof into engagement with element 86 for transmitting torque thereto from shaft 70.

Friction clutch 82 is arranged to be operated by a fluid pressure clutch actuator 88 through a lever 89 which is fulcrumed intermediate its ends on a fixed pin 90. A yoke attached to one end of lever 89 provides for operative connection with the friction element 87 of clutch 82, an integral sleeve in which is formed an annular groove 91 being provided said element for receiving said yoke. The opposite end of lever 89 may be connected through a link 92 to one end of a rod 93 of the clutch actuator 88. Actuator 88 comprises a casing containing a piston 94 which is connected to the rod 93. At one side of piston 94 there is a chamber 95 connected to the pipe 56, while at its opposite side there is a spring chamber 96 which is constantly open to the atmosphere. A release spring 97 is disposed in chamber 96 arranged to urge piston 94 in the direction of chamber 95 toward its rest position seated on an annular shoulder formed in the casing, in which position it is shown in the drawing. In rest position of piston 94, clutch 82 is in its release position with element 87 disengaged from element 86. When fluid under pressure is supplied to chamber 95, piston 94 is caused to move in the direction of chamber 96 against action of spring 97, and through stem 93, link 92, and lever 89 it causes engagement of element 87 with element 86 in friction clutch 82 for coupling shaft 81 to shaft 70 through sprocket wheels 83, 85 and chain 84. When fluid under pressure is subsequently vented from chamber 95 in actuator 88, spring 97 returns piston 94 to rest position and causes clutch 82 to disengage.

According to a feature of the invention, engagement of the clutch 82 is effected to connect the shaft 76 of engine 1 to the shaft 70 of engine 2, through supply of fluid under pressure to pipe 56, at the same time that the speed of both engines 1, 2 is brought under the control of control valve devices 15 and 16 and is thereby synchronized. Conversely, disengagement of clutch 82 is effected automatically, through release of fluid under pressure in pipe 56, at the same time that speed of the engines 1, 2 are rendered controllable individually through operation of valve devices 15, 16 and the valve device 17, respectively.

By means of such an arrangement, an operator of the equipment may compound or render independent both control of and output of the engines 1, 2 merely by positioning handle 68 in valve device 55.

*Summary*

It will now be seen that I have provided a fluid pressure control apparatus for controlling the operation of an engine power package comprising a plurality of power units such as a pair of internal combustion engines and a multiple speed transmission.

The control apparatus comprises means for effecting regulation of speed of the two engines independently when so employed and means for effecting compounding of their outputs as well as simultaneously effecting synchronous control of their throttle or governor position.

Having now described my invention, what I claim as new and desire to secure by Letters Patent, is:

Fluid pressure apparatus for controlling operation and compounding of two engines comprising respective speed control means and respective power output shafts, the combination, of a first fluid pressure actuator responsive to variations in pressure of fluid in a first pressure chamber to adjust one of said speed control means, a second fluid pressure actuator responsive to variations in pressure of fluid in a second pressure chamber to adjust the other of said speed control means, fluid pressure operated clutch means responsive to supply and release of fluid under pressure to and from a third pressure chamber to establish and disestablish, respectively, connection of said output shafts, a fluid pressure conduit, relay valve means responsive to supply and release of fluid under pressure to and from said third pressure chamber to connect said second pressure chamber selectively to said first pressure chamber and to said conduit, respectively, clutch control valve means to supply and release fluid under pressure to and from said third pressure chamber, and a pair of operator's speed control valve devices to vary pressure of fluid in said first pressure chamber and in said conduit, respectively.

ROY R. STEVENS.

References Cited in the file of this patent

UNITED STATES PATENTS

| Number | Name | Date |
|---|---|---|
| 1,121,114 | Moore | Dec. 15, 1914 |
| 2,288,173 | Wohanka | June 30, 1942 |
| 2,326,911 | Aikman | Aug. 17, 1943 |
| 2,422,596 | Stevens | June 17, 1947 |
| 2,428,457 | Hines | Oct. 7, 1947 |
| 2,444,364 | Panish | June 29, 1948 |